March 22, 1949. W. N. ALDERMAN 2,465,184
BUILDING HEATING SYSTEM
Filed Sept. 18, 1946 3 Sheets-Sheet 2

Inventor
William N. Alderman
by Parker & Carter
Attorneys

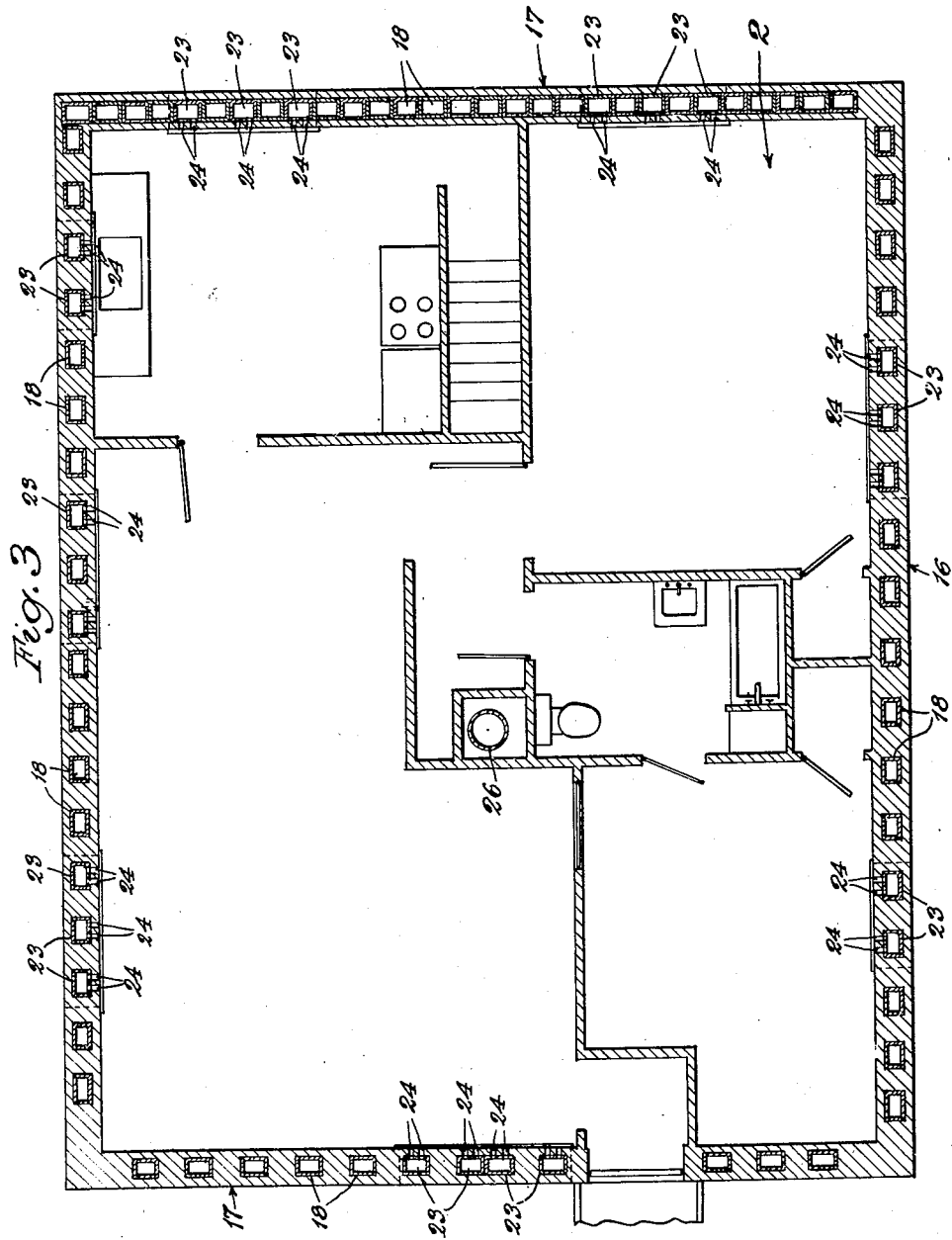
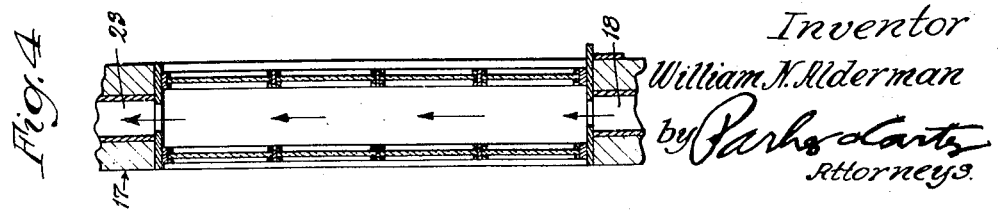

Patented Mar. 22, 1949

2,465,184

UNITED STATES PATENT OFFICE 2,465,184

BUILDING HEATING SYSTEM

William N. Alderman, Chicago, Ill.

Application September 18, 1946, Serial No. 697,615

10 Claims. (Cl. 237—69)

My invention relates to improvements in house heating systems and methods of house heating. It has for one object to provide a new and improved type of house heating system, in which hot air is used to provide radiant heat from the floor and walls, and is also forced into the rooms and, when spent, drawn out of the rooms, whereby positive air circulation is insured.

Other objects will appear from time to time in the specification.

I propose to build a house or similar structure wherein the floor will include a substantially continuous series of hollow tile forming air ducts extending from a central heat zone in the house to the outer walls thereof. I propose to supply hot air under pressure through a series of supply trunks communicating with the hollow tile in the floor. The walls will be hollow and communicate with the floor tiles so that air forced through the floor tiles may pass up through the hollow wall and be discharged into the room through apertures, preferably beneath and on both sides of the windows and outer doors. The upper portion of the wall will also be hollow and will have apertures opening into the room, and will communicate with exhaust ducts, whereby spent air from the room will be drawn back through the hollow wall, pass toward the top thereof and then be led through return ducts back to the center of the house for return to the heat zone.

Because floor temperatures must, in the interest of comfort of the occupants, not rise above a certain predetermined point, and because the air in the walls which will subsequently be discharged to the room should be at a higher temperature, I propose to reheat the air at the point where it enters the wall structure. This will be done by means preferably of a continuous heat exchange pipe extending throughout the entire periphery of the house in line with the floor, whereby the hot air which has been fed through the floor tiles and has lost some of its heat will be raised to a temperature higher than the temperature at which it was originally supplied to the floor tile system.

I propose to use any suitable type of heater, preferably a water heater or steam generator together with a heat interchange radiator which will heat the air forced by positive fan or the like, into and through the system. The positive air circulating means may draw cold air from the outside of the house or from the return ducts or from a combination of the two as the case may be. In any event the floor and walls will be heated to heat the rooms by radiant heat, and the hot air which has accomplished the radiant heating function will then be reheated and fed into the rooms and subsequently withdrawn therefrom to insure adequate ventilation without genuine heat loss.

I illustrate my invention more or less diagrammatically in the accompanying drawings wherein:

Figure 3 is a section on the line 3—3 of Figure 1.

Figure 4 is a section similar to the section shown in Figure 1 showing a modified form of the device.

Like parts are indicated by like symbols throughout the specification and drawings.

Figure 1:
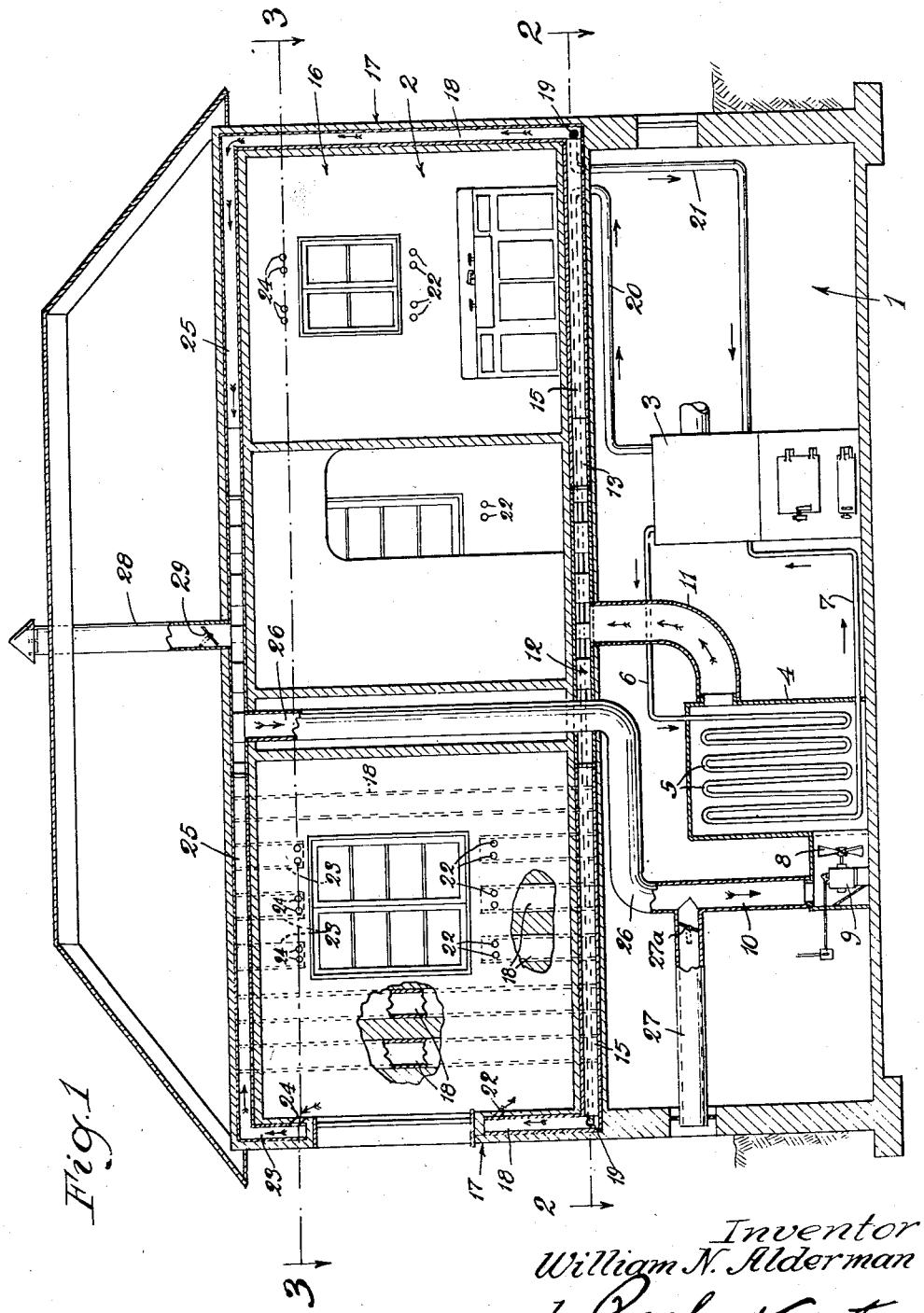
Figure 1 is a vertical section of a building.
Figure 2:
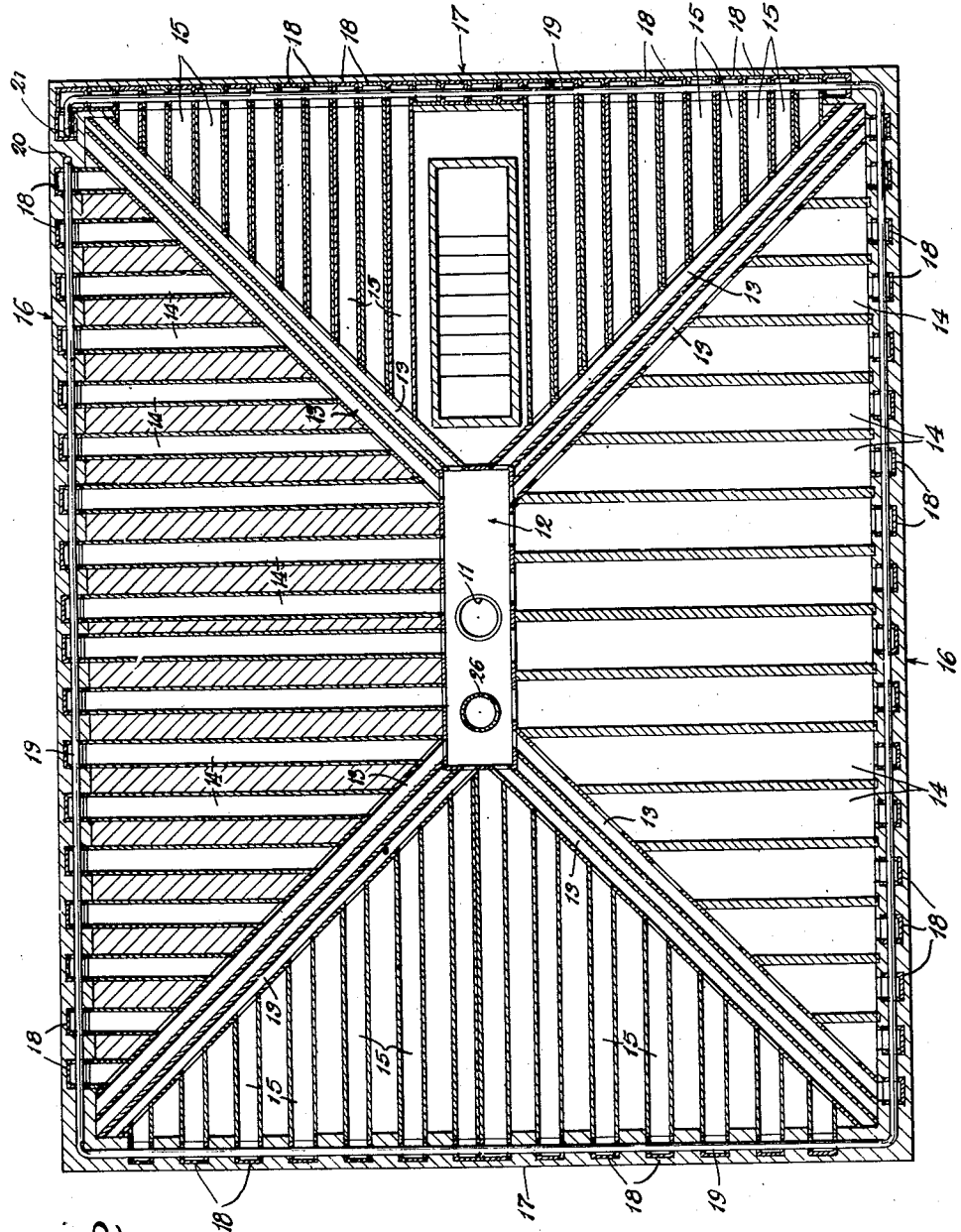
Figure 2 is a section on the line 2—2 of Figure 1.

The house or building illustrated in Figure 1 has a basement 1 and an upper floor 2 divided into a plurality of rooms as indicated. 3 is a hot water or steam boiler, gas or coal fired, as the case may be. 4 is a heat exchange radiator containing coil 5 supplied with hot water or steam from the boiler 3 by means of the hot pipe 6 and the cold return pipe 7. 8 is a fan driven by a motor 9 and adapted to draw cold air through the conduit 10 pass it through the radiator and discharge it to the supply conduit 11. 12 is a hot air chamber which may be in the floor structure as indicated or below it as the case may be. Extending radially from this hot air chamber within the floor structure are a series of main pipes or trunks 13. Pipes 13 communicate with hollow floor tile conduits 14, 15 generally perpendicular to the outer walls of the house 16, 17. The outer house walls are hollow being formed of hollow conduit tiles 18 which communicate with the hollow floor tiles 14, 15 so that hot air, under pressure, is forced by the fan through the radiator 4, conduits 11, hot air box 12, manifold ducts 13, floor tiles 14, 15 and the wall tiles 18.

At the junction between the hollow tiles 14, 15 and the wall tiles 18 is disposed a continuous heat interchange pipe 19 which extends through the entire periphery of the house either as a single unit or formed of a series of separate sections all supplied with hot water or steam through pipes 20 from the boiler, cooled water or condensed steam returning through pipe 21. The result of this arrangement is that the hot air having lost some of its heat as it passes through the floor tiles is again heated as it passes around the heat loop 19 before it passes upwardly through the walls of the house. 22 are discharge apertures in the interior side of the peripheral house wall 16, 17 so that the hot air reheated by the loop 19 is discharged into the room, preferably at a point adjacent the window level.

The upper portions of the peripheral house walls are also hollow as indicated at 23 and apertured at 24 to receive spent air from the room which is returned from the upper portion of the wall through the return duct system 25 generally parallel with and above the floor, back to the center portion of the house where it passes down through a duct 26 to supply air for the fan. 27 is a branch conduit extending from the outside of the house to the duct 26 adapted to be controlled by the valve 27a, whereby the duct 27 may be opened or closed to provide additional outside air. 28 is a discharge conduit from the upper portion of the system which may be used, being controlled by the valve 29, if desired, thus permitting the escape of spent air from the house without passing through the conduit 26.

The house arrangement is, of course, diagrammatic, the particular details of the house arrangement, conduit arrangement and the particular location of the heat exchange valve and passages may be varied. The important thing is that the arrangement as shown is an operative arrangement adequate to circulate hot air through the house in such a way that the air heats the floor panel to comfortable temperatures while the additional heat source at the intersection of the wall and floor panel is adequate to give the wall panel the temperature desired and also to heat the air admitted to the room to proper temperature.

I have illustrated the hot air ducts in the floor which conduct the air to the wall as formed of a continuous mass of tiles arranged side by side. I have also shown them spaced apart with filling material between and, finally I have shown the spaces between the floor joints as forming the hot air ducts. The latter is permissible because the air fed through these ducts is much lower in temperature than the air normally used for hot air heating of houses.

It will be understood that according to the modification shown in Figure 4, it is entirely practical to heat a house without any mass air heating. Under these circumstances the hot air would pass up from the floor through the hollow walls and also through the window embrasures between the outer and inner windows and return to the center for re-use or for discharge. Under these circumstances, other means would be used, if necessary, to change the air.

I may also use the space immediately above and immediately below window openings as locations for air ports so that air is fed into the room below the window and discharged from it above; the remaining air passing upwardly through the wall for return. Another possible modification would be to discharge air into the room and withdraw it from the room at points other than the window as, for instance, under the chair rail or the molding. In any event, the system circulates hot air beneath the floor, raises it to higher temperature as it is fed into the walls and returns the air for discharge as spent air or for recirculation.

I claim:

1. The method of heating houses and the like which includes forcing hot air outwardly under positive pressure, from a central hot air zone, through the floor, whereby the latter is heated, toward all of the peripheral walls, reheating the air as it reaches the walls to a temperature above the temperature at which it enters the floor, forcing the reheated air upwardly through the walls and thereafter discharging it into the interior of the house.

2. The method of heating houses and the like which includes forcing hot air outwardly under positive pressure, from a central hot air zone, through the floor, whereby the latter is heated, toward all of the peripheral walls, reheating the air as it reaches the walls to a temperature above the temperature at which it enters the floor, forcing the reheated air upwardly through the walls, and then withdrawing the spent air from the interior of the house through the upper portion of the peripheral walls.

3. The method of heating houses and the like which includes forcing hot air outwardly under positive pressure, from a central hot air zone, through the floor, whereby the latter is heated, toward all of the peripheral walls, reheating the air as it reaches the walls to a temperature above the temperature at which it enters the floor, forcing the reheated air upwardly through the walls, and then withdrawing the spent air from the interior of the house through the upper portion of the peripheral walls, returning the spent air to the hot air zone and reheating and recirculating it.

4. A house heating system including hollow floors and hollow peripheral walls, means for heating air, means for circulating the hot air under positive pressure through the floor to and through the walls, and for discharging it into the interior of the house, and means for reheating the air to a temperature above the temperature at which it enters the floor as it leaves the floor and passes into the walls.

5. A house heating system including hollow floors and hollow peripheral walls, means for heating air, means for circulating the hot air under positive pressure through the floor to and through the walls, and for discharging it into the interior of the house, and means for reheating the air to a temperature above the temperature at which it enters the floor as it leaves the floor and passes into the walls, means for withdrawing spent air from the interior of the house through the hollow peripheral walls.

6. A house heating system including hollow floors and hollow peripheral walls, means for heating air, means for circulating the hot air under positive pressure through the floor to and through the walls, and for discharging it into the interior of the house, and means for reheating the air to a temperature above the temperature at which it enters the floor as it leaves the floor and passes into the walls, means for withdrawing spent air from the interior of the house through the hollow peripheral walls, means for returning the air to the heating and circulating means for reheating and recirculation.

7. A house heating system comprising a floor structure including hollow tiles defining a series of conduits extending outwardly to the peripheral house walls, the walls including hollow tiles defining vertical conduits in register with the floor conduits, said conduits terminating in apertures through the walls discharging into the interior of the house, a hot air manifold communicating with the inner ends of the floor conduits, means for heating air, and means for forcing the hot air positively through the heating means into and through the conduits, means at the juncture of the vertical conduits and the floor conduits for additionally heating the air.

8. A house heating system comprising a floor structure including hollow tiles defining a series of conduits extending outwardly to the peripheral house walls, the walls including hollow tiles defining vertical conduits in register with the floor conduits, said conduits terminating in apertures through the walls discharging into the interior of the house, a hot air manifold communicating with the inner ends of the floor conduits, means for heating air, and means for forcing the hot air positively through the heating means into and through the conduits, the walls including hollow tiles defining separate spent air conduits having intake apertures communicating with the interior of the house, conduits communicating with the spent air conduits adapted to return the air to the heating means, whereby spent air may be withdrawn from the interior of the house and recirculated through the system, means at the juncture of the vertical conduits and the floor conduits for additionally heating the air.

9. The method of heating houses and the like which includes forcing hot air outwardly under positive pressure from a central hot air zone through the floor, whereby the latter is heated toward all of the peripheral walls of the house, reheating the air as it reaches the walls to a temperature above the temperature at which it enters the floor, forcing the reheated air upwardly through the walls to a point adjacent the ceiling and then withdrawing the air.

10. The method of heating houses and the like which includes forcing hot air outwardly under positive pressure from a central hot air zone through the floor, whereby the latter is heated toward all of the peripheral walls of the house, reheating the air as it reaches the walls to a temperature above the temperature at which it enters the floor, forcing the reheated air upwardly through the walls to a point adjacent the ceiling and then withdrawing the air for selective discharge from the system or for recirculation.

WILLIAM N. ALDERMAN.

REFERENCES CITED

The following references are of record in the file of this patent:

UNITED STATES PATENTS

| Number | Name | Date |
| --- | --- | --- |
| 1,024,788 | Kitchen | Apr. 30, 1912 |
| 1,681,582 | Fjelstad | Aug. 21, 1928 |
| 2,107,523 | Coe | Feb. 8, 1938 |
| 2,181,814 | Knapp | Nov. 28, 1939 |